(12) United States Patent
Kimes et al.

(10) Patent No.: US 9,377,061 B2
(45) Date of Patent: Jun. 28, 2016

(54) ELECTROMAGNETIC SYSTEM FOR CONTROLLING THE OPERATING MODE OF AN OVERRUNNING COUPLING ASSEMBLY AND OVERRUNNING COUPLING AND CONTROL ASSEMBLY INCLUDING THE SYSTEM

(71) Applicant: Means Industries, Inc., Saginaw, MI (US)

(72) Inventors: John W. Kimes, Wayne, MI (US); Philip B. Woodley, Chicago, IL (US)

(73) Assignee: Means Industries, Inc., Saginaw, MI (US)

( * ) Notice: Subject to any disclaimer, the term of this patent is extended or adjusted under 35 U.S.C. 154(b) by 78 days.

(21) Appl. No.: 14/488,673

(22) Filed: Sep. 17, 2014

(65) Prior Publication Data

US 2015/0001023 A1 Jan. 1, 2015

Related U.S. Application Data

(63) Continuation-in-part of application No. 13/370,507, filed on Feb. 10, 2012, now Pat. No. 9,303,699, which is a continuation-in-part of application No. 13/218,817, filed on Aug. 26, 2011, now Pat. No.

(Continued)

(51) Int. Cl.
*F16D 41/12* (2006.01)
*F16D 27/108* (2006.01)

(52) U.S. Cl.
CPC ............ *F16D 41/125* (2013.01); *F16D 27/108* (2013.01)

(58) Field of Classification Search
CPC ....... F16D 27/00; F16D 27/004; F16D 27/01; F16D 27/108; F16D 41/12; F16D 41/125; F16D 41/16; F16D 41/18; F16D 41/185; F16D 41/26; F16D 48/064
USPC .................................................. 192/45.1, 43
See application file for complete search history.

(56) References Cited

U.S. PATENT DOCUMENTS 2,863,326 A 12/1958 Maurice et al.
2,866,109 A 12/1958 Watson
(Continued)

FOREIGN PATENT DOCUMENTS

GB 1007475 A 10/1965
JP 09196128 7/1997

OTHER PUBLICATIONS

International Search Report and Written Opinion; related international application No. PCT/US2014/057140; date of mailing Feb. 26, 2015.

(Continued)

*Primary Examiner* — Jacob S Scott
(74) *Attorney, Agent, or Firm* — Brooks Kushman P.C.

(57) ABSTRACT

An electromagnetic system for controlling the operating mode of an overrunning coupling assembly is provided. A control member is mounted for controlled shifting movement between coupling faces of coupling members and a stator structure including at least one electromagnetic source to create a magnetic force when energized. A magnetic or ferromagnetic translator structure is coupled to the control member for selective, small displacement, control member movement. The translator structure is magnetically coupled to the stator structure across an air gap and is supported for translational movement relative to the stator structure along a path between first and second stable end positions. The translator structure completes a path of magnetic flux to magnetically latch in at least one of the end positions and to translate along the path between the end positions upon experiencing a net translational force.

24 Claims, 9 Drawing Sheets

Related U.S. Application Data 8,888,637, which is a continuation-in-part of application No. PCT/US2011/036636, filed on May 16, 2011.

(60) Provisional application No. 61/882,694, filed on Sep. 26, 2013, provisional application No. 61/421,868, filed on Dec. 10, 2010, provisional application No. 61/931,770, filed on Jan. 27, 2014.

(56) References Cited

U.S. PATENT DOCUMENTS

| | | | |
|---|---|---|---|
| 2,947,537 A | 8/1960 | Littell et al. |
| 2,959,062 A | 11/1960 | Looker |
| 2,960,287 A | 11/1960 | Barlow |
| 2,966,975 A | 1/1961 | Wiedmann et al. |
| 2,969,134 A | 1/1961 | Wiedmann et al. |
| 3,130,989 A | 4/1964 | Lannen |
| 4,050,560 A | 9/1977 | Torstenfelt |
| 4,340,133 A | 7/1982 | Blersch |
| 4,651,847 A | 3/1987 | Hermanns |
| 5,046,594 A | 9/1991 | Kakinuma |
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,342,258 A | 8/1994 | Egyed |
| 5,362,293 A | 11/1994 | Romanauskas |
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,827,148 A | 10/1998 | Seto et al. |
| 5,846,257 A | 12/1998 | Hood |
| 5,847,469 A | 12/1998 | Tabata et al. |
| 5,856,709 A | 1/1999 | Ibaraki et al. |
| 5,918,715 A | 7/1999 | Ruth et al. |
| 5,924,510 A | 7/1999 | Itoh et al. |
| 5,927,455 A | 7/1999 | Baker et al. |
| 6,019,699 A | 2/2000 | Hoshiya et al. |
| 6,065,576 A | 5/2000 | Shaw et al. |
| 6,075,302 A | 6/2000 | McCleer |
| 6,193,038 B1 | 2/2001 | Scott et al. |
| 6,237,931 B1 | 5/2001 | Marola |
| 6,244,965 B1 | 6/2001 | Klecker et al. |
| 6,290,044 B1 | 9/2001 | Burgman et al. |
| 6,306,057 B1 | 10/2001 | Morisawa et al. |
| 6,328,670 B1 | 12/2001 | Minowa et al. |
| 6,344,008 B1 | 2/2002 | Nagano et al. |
| 6,503,167 B1 | 1/2003 | Sturm |
| 6,692,405 B2 | 2/2004 | Minowa et al. |
| 6,814,201 B2 | 11/2004 | Thomas |
| 6,827,167 B2 | 12/2004 | Cikanek et al. |
| 6,846,257 B2 | 1/2005 | Baker et al. |
| 6,905,009 B2 | 6/2005 | Reed et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,201,690 B2 | 4/2007 | Miura et al. |
| 7,223,198 B2 | 5/2007 | Kimes et al. |
| 7,223,200 B2 | 5/2007 | Kojima et al. |
| 7,255,186 B2 | 8/2007 | Wakuta et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,393,296 B2 | 7/2008 | Kano et al. |
| 7,397,296 B1 | 7/2008 | Kiani |
| 7,426,971 B2 | 9/2008 | Kano et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,614,466 B2 | 11/2009 | Kano et al. |
| 7,621,359 B2 | 11/2009 | Kano et al. |
| 7,690,455 B2 | 4/2010 | Kano et al. |
| 7,695,387 B2 | 4/2010 | Oba |
| 7,743,678 B2 | 6/2010 | Wittkopp et al. |
| 7,806,795 B2 | 10/2010 | Oba et al. |
| 7,898,121 B2 | 3/2011 | Ramsay et al. |
| 7,942,781 B2 | 5/2011 | Kimes |
| 7,992,695 B2 | 8/2011 | Wittkopp et al. |
| 8,051,959 B2 | 11/2011 | Eisengruber |
| 8,061,496 B2 | 11/2011 | Samie et al. |
| 8,079,453 B2 | 12/2011 | Kimes |
| 8,286,772 B2 | 10/2012 | Eisengruber |
| 8,443,956 B2 | 5/2013 | Bauer et al. |
| 2001/0049306 A1 | 12/2001 | Tanaka |
| 2004/0110594 A1 | 6/2004 | Goto |
| 2004/0159517 A1 | 8/2004 | Thomas |
| 2004/0238306 A1 | 12/2004 | Reed et al. |
| 2006/0138777 A1 | 6/2006 | Hofbauer et al. |
| 2006/0185957 A1 | 8/2006 | Kimes et al. |
| 2006/0252589 A1 | 11/2006 | Tay |
| 2006/0278487 A1 | 12/2006 | Pawley et al. |
| 2007/0034470 A1 | 2/2007 | Fetting, Jr. et al. |
| 2007/0056825 A1 | 3/2007 | Fetting, Jr. et al. |
| 2007/0107960 A1 | 5/2007 | Takami et al. |
| 2007/0278061 A1 | 12/2007 | Wittkopp et al. |
| 2008/0093190 A1 | 4/2008 | Belmont |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2008/0245360 A1 | 10/2008 | Almy et al. |
| 2008/0277891 A1 | 11/2008 | Adams, III et al. |
| 2009/0084653 A1 | 4/2009 | Holmes |
| 2009/0098968 A1 | 4/2009 | Maguire et al. |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0044141 A1 | 2/2010 | Kimes et al. |
| 2010/0071497 A1 | 3/2010 | Reisch et al. |
| 2010/0119389 A1 | 5/2010 | Lazebnik et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0011694 A1 | 1/2011 | Swales et al. |
| 2011/0140451 A1 | 6/2011 | Sharples et al. |
| 2011/0177900 A1 | 7/2011 | Simon |
| 2011/0183806 A1 | 7/2011 | Wittkopp et al. |
| 2011/0192697 A1 | 8/2011 | Prout et al. |
| 2011/0215575 A1 | 9/2011 | Hofbauer et al. |
| 2011/0233026 A1 | 9/2011 | Pawley |
| 2012/0090952 A1* | 4/2012 | Lee ............... F16D 41/125 192/41 R |
| 2012/0145505 A1 | 6/2012 | Kimes |
| 2012/0145506 A1 | 6/2012 | Samie et al. |
| 2012/0152683 A1 | 6/2012 | Kimes |
| 2012/0152687 A1 | 6/2012 | Kimes et al. |
| 2014/0102844 A1 | 4/2014 | Greene et al. |
| 2014/0190785 A1 | 7/2014 | Fetting et al. |
| 2014/0284167 A1 | 9/2014 | Kimes |

OTHER PUBLICATIONS

International Search Report and Written Opinion; International application No. PCT/US14/56749; date of mailing Dec. 24, 2014.
International Search Report and Written Opinion, International application No. PCT/US2011/036636; mailed Aug. 26, 2011.
International Search Report and Written Opinion, International application No. PCT/US2011/036634; mailed Aug. 25, 2011.
International Search Report and Written Opinion, International application No. PCT/US2012/025046; date of mailing May 21, 2012.

(56) References Cited

OTHER PUBLICATIONS

International Search Report and Written Opinion, International application No. PCT/US2012/050742; date of mailing Nov. 20, 2012.
International Search Report and Written Opinion, International application No. PCT/US2012/50749; date of mailing Dec. 11, 2012.
International Preliminary Report on Patentability; International application No. PCT/US2012/025046; date of issuance of report Aug. 21, 2013.
International Preliminary Report on Patentability; International application No. PCT/US2012/050749; date of issuance of report Mar. 4, 2014.
International Preliminary Report on Patentability; International application No. PCT/US2012/050742; date of issuance of report Mar. 4, 2014.
International Preliminary Report on Patentability; International application No. PCT/US2012/050753; date of issuance of report Mar. 25, 2014.
Office Action; U.S. Appl. No. 13/370,507; date of mailing Aug. 27, 2014.
International Search Report and Written Opinion; related international application No. PCT/US2014/056716; date of mailing Mar. 3, 2015.
Office Action; related U.S. Appl. No. 14/487,234; notification date Feb. 11, 2016.
Notice of Rejection; English Summary; related Japanese application No. 2013-553658; draft date Dec. 24, 2015.
International Preliminary Report on Patentability; related International application No. PCT/US2014/056716; date of issuance of report Mar. 29, 2016.
International Preliminary Report on Patentability; related International application No. PCT/US2014/056749; date of issuance of report Mar. 29, 2016.
International Preliminary Report on Patentability; related International application No. PCT/US2014/057140; date of issuance of report Mar. 29, 2016.
International Search Report and Written Opinion; related International application No. PCT/US2016/013836; date of mailing Mar. 30, 2016.
Notice of Allowance and Fee(s) Due; related U.S. Appl. No. 13/370,507; date mailed Dec. 18, 2015.

* cited by examiner

ELECTROMAGNETIC SYSTEM FOR CONTROLLING THE OPERATING MODE OF AN OVERRUNNING COUPLING ASSEMBLY AND OVERRUNNING COUPLING AND CONTROL ASSEMBLY INCLUDING THE SYSTEM

CROSS-REFERENCE TO RELATED APPLICATIONS

This application claims the benefit of U.S. Application 61/882,694 filed Sep. 26, 2013. This application is a continuation-in-part application of U.S. patent application Ser. No. 13/370,507 filed Feb. 10, 2012. That application is a continuation-in-part of U.S. patent application Ser. No. 13/218,817 filed Aug. 26, 2011 which, in turn, is a continuation-in-part of U.S. national phase of PCT Application No. PCT/US11/36636 filed May 16, 2011 which claims the benefit of U.S. provisional patent application No. 61/421,868 filed Dec. 10, 2010. This application also claims the benefit of U.S. provisional patent application Ser. No. 61/931,770 filed Jan. 27, 2014.

TECHNICAL FIELD

This invention relates, in general, to the field of overrunning coupling and control assemblies and, more particularly, to systems controlling the operating mode of overrunning coupling assemblies.

OVERVIEW

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

roller type which includes spring-loaded rollers between inner and outer races of the one-way clutch. (Roller type is also used without springs on some applications); and sprag type which includes asymmetrically shaped wedges located between inner and outer races of the one-way clutch.

One-way clutches typically over run during engine braking rather than enable engine braking. It is for this reason there is a friction pack at the same transmission node. Selectable dynamic clutches can be used to prevent the over running condition and enable engine braking.

Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selection mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable or selectable OWC's which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvements in clutches subjected to difficult service conditions such as extreme temperatures. This is particularly true in the automotive industry where developers and manufacturers of clutches for automotive applications must meet a number of competing performance specifications for such articles.

Another problem associated with prior art coupling and control assemblies is that it is undesirable to have a relatively large distance between the control element and the activator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include 2012/0145506; 2011/0192697; 2011/0183806; 2010/0252384; 2009/0194381; 2008/0223681; 2008/0169166; 2008/0185253; and the following U.S. Pat. Nos. 8,079,453; 7,992,695, 8,051,959, 7,743,678; and 7,491,151.

Figure 1A:
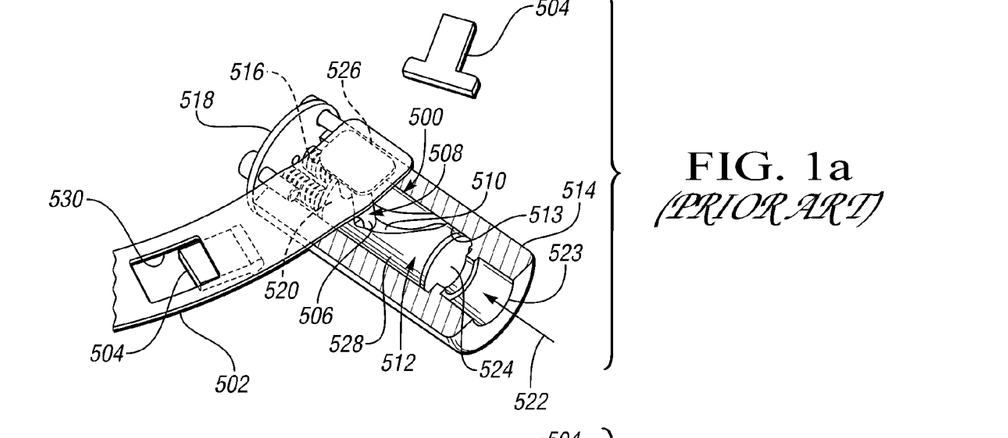
FIGS. 1a-1c are schematic views, partially broken away and in cross section, of a control element or member with associated struts and its control apparatus of the prior art in the form of a perpendicular actuating shift valve or piston (latching mechanism) in different control positions in the different views.
Figure 1B:
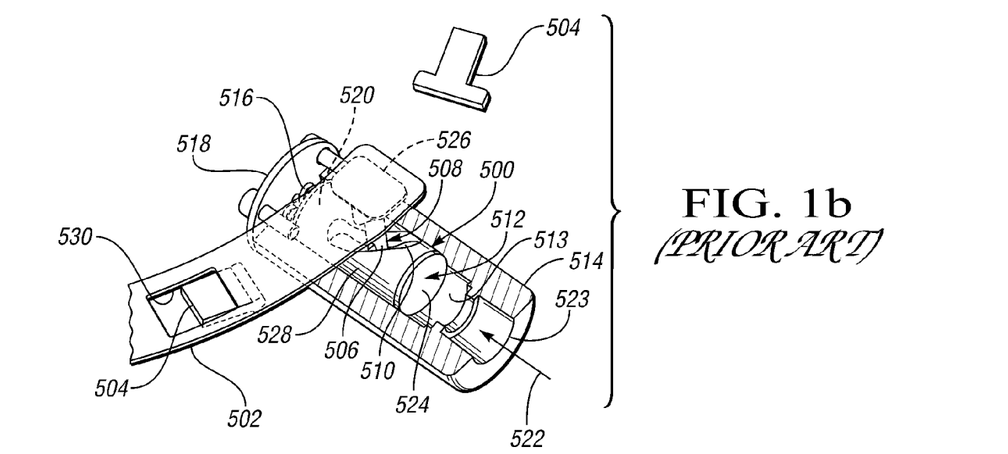
Figure 1C:
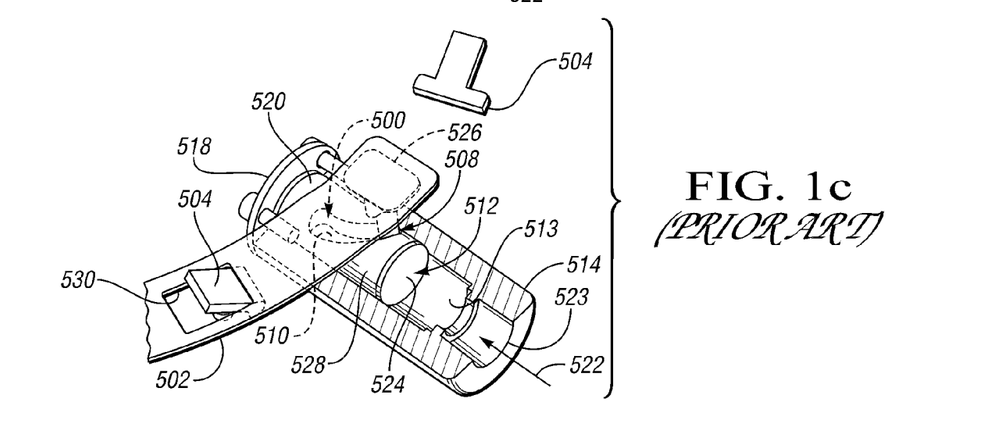

U.S. Pat. No. 8,272,488 discloses in its FIGS. 9a-9c (labeled as FIGS. 1a-1c, respectively, in this Application), a "perpendicular actuating shift valve" latching mechanism, generally indicated at 500. A control plate or element 502 of a one-way clutch is provided which shifts or slides along a shift direction between pocket and recess plates (not shown) of the clutch to controllably cover and uncover struts 504 which are spring-biased within the pocket plate. A free end portion 506 of an actuating arm or pin, generally indicated at 508, may move within a curved pin recess or groove 510 formed in an outer surface 528 of a valve or piston, generally indicated at 512, in a direction substantially perpendicular to a shift direction of the control plate 502 during sliding movement of the piston or valve 512 within a bore 513 formed in a housing 514. The side walls or surfaces of the groove 510 lock the pin 508 therebetween as shown in FIG. 1a to prevent movement of the pin 508 in a direction parallel to the shift direction of the control plate 502. The groove 510 may be curved and the free end portion 506 of the actuating arm 508 may simultaneously move within the groove 510 in both a direction substantially parallel to the shift axis and in a direction substantially perpendicular to the shift axis during movement of the piston 512 within the housing 514. Compression springs 516, also disposed within the bore 513, are biased between a cover 518 of the housing 514 and one end 520 of the valve 512. The plate 502 of the one-way clutch is disclosed in its overrun position in FIG. 1a and moves to its locked position in FIG. 1c. Application of a control pressure 522 through a control portion 523 of the housing 514 at the opposite end 524 of the valve or piston 512 causes the valve 512 to move against the biasing action of the compression springs 516 so that the actuating pin 508, which is secured to the control plate 502 at a pin attachment portion 526, moves within the curved pin recess or groove 510 formed in the outer surface 528 of the valve 512 as shown in FIGS. 1b and 1c. As shown in FIG. 1c, one of the struts 504 now extends through an aperture 530 formed in the control plate 502 to lock the one-way clutch.

Other U.S. patent publications which disclose controllable or selectable one-way clutches include U.S. Pat. Nos. 6,193,038; 7,198,587; 7,275,628; and 7,464,801, and U.S. Publication Application Nos. 2007/0278061; 2008/0110715; 2009/0159391; and 2009/0211863.

Other U.S. patent documents related to the present application include: U.S. Pat. Nos. 2,947,537; 2,959,062; 4,050,560; 4,651,847; 6,905,009; 8,061,496; 8,286,772; 2004/0238306; 2006/0185957; 2007/0034470; 2012/0152683; and 2012/0152687.

U.S. Pat. No. 7,942,781 discloses a high-efficiency vehicular transmission. The transmission includes a transmission housing, a set of torque delivery elements which include first and second elements supported for rotation within the housing and an electric motor for changing angular velocity of at least one of the elements in response to an electrical signal during a shift to obtain a desired transmission ratio. At least one non-friction controllable coupling assembly has a coupling state for coupling the first element to either the second element or the housing and an uncoupling state for uncoupling the first element from either the second element or the housing, respectively. The at least one coupling assembly is non-hydraulically controlled to change state to maintain the desired transmission ratio.

Other related U.S. patent publications include: 2011/0140451; 2011/0215575; 2011/0233026; 2011/0177900; 2010/0044141; 2010/0071497; 2010/0119389; 2009/0133981; 2009/0127059; 2009/0084653; 2009/0142207; 2009/0255773; 2009/0098968; 2010/0200358; 2009/0211863; 2009/0159391; 2009/0098970; 2008/0110715; 2008/0169165; 2007/0278061; 2007/0056825; 2006/0252589; 2006/0278487; 2006/0138777; 2006/0185957; 2004/0110594; and the following U.S. Pat. Nos. 7,942,781; 7,806,795; 7,695,387; 7,690,455; 7,484,605; 7,464,801; 7,349,010; 7,275,628; 7,256,510; 7,223,198; 7,198,587; 7,093,512; 6,953,409; 6,846,257; 6,814,201; 6,503,167; 6,328,670; 6,692,405; 6,193,038; 4,050,560; 4,340,133; 5,597,057; 5,918,715; 5,638,929; 5,342,258; 5,362,293; 5,678,668; 5,070,978; 5,050,534; 5,387,854; 5,231,265; 5,394,321; 5,206,573; 5,453,598; 5,642,009; 6,075,302; 6,065,576; 6,982,502; 7,153,228; 5,846,257; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high speed moves with low mass payloads. Mechanical simplicity and precise open loop operation are additional features of the stepper linear motor systems.

A linear stepping motor operates on the same electromagnetic principles as a rotary stepping motor. The stationary part or platen is a passive toothed steel bar extending over the desired length of travel. Permanent magnets, electromagnets with teeth, and bearings are incorporated into the moving elements or forcer. The forcer moves bidirectionally along the platen, assuring discrete locations in response to the state of the currents in the field windings. In general, the motor is two-phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bidirectionally along the platen assuming discrete locations in response to the state of the electrical current in its field windings.

Mechanical forces that are due to local or distant magnetic sources, i.e. electric current and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of fore production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

SUMMARY OF EXAMPLE EMBODIMENTS

An object of at least one embodiment of the present invention is to provide an improved electromagnetic system for controlling the operating mode of an overrunning coupling assembly and an improved overrunning coupling and control assembly including the system.

In carrying out the above object and other objects of at least one embodiment of the present invention, an electromagnetic system for controlling the operating mode of an overrunning coupling assembly is provided. The assembly includes first and second coupling members having first and second coupling faces, respectively, in close-spaced opposition with one another. At least one of the members is mounted for rotation about an axis. The system includes a control member mounted for controlled shifting movement between the coupling faces. A stator structure includes at least one electromagnetic source to create a magnetic force when energized. A magnetic or ferromagnetic translator structure is coupled to the control member for selective, small displacement, control member movement. The translator structure is magnetically coupled to the stator structure across an air gap and is supported for translational movement relative to the stator structure along a path between first and second stable end positions which correspond to first and second operating modes of the coupling assembly, respectively. The translator structure completes a path of magnetic flux to magnetically latch in at least one of the end positions and to translate along the path between the end positions upon experiencing a net translational force comprising a first translational force caused by energization of the at least electromagnetic source and a latching force based upon position of the translator structure along the path.

The system may further include at least one biasing member to exert a biasing force on the translator structure. The net translational force further includes the biasing force caused by the at least one biasing member.

The system may further include a permanent magnet source either coupled to the translator structure to move therewith or coupled to the stator structure.

One of the end positions may be an overrun position, one of the modes may be an overrun mode, the other of the end positions may be a locked position, and the other of the modes may be a locked mode.

One of the coupling members may include a notch plate and the other of the coupling members may include a pocket plate coupled to the stator structure.

The system may further include a locking member disposed between the coupling faces of the coupling members and movable between first and second positions. The control member causes the locking member to change position in an intermediate position of the translator structure wherein the coupling members are torque-locked going from the first end position to the second end position.

The locking member may be a reverse strut.

The control member may be a control or selector plate rotatable about the axis.

The control member may have at least one opening which extends completely therethrough to allow the locking member to extend therethrough to the first position of the locking member in a control position of the control member.

The path may be a curved path.

Each biasing member may include a spring.

Further in carrying out the above object and other objects of at least one embodiment of the present invention, an overrunning coupling and electromagnetic control assembly is provided. The assembly includes a coupling subassembly including first and second coupling members having first and second coupling faces, respectively, in close-spaced opposition with one another. At least one of the members is mounted for rotation about an axis. The assembly also includes a control member mounted for controlled shifting movement between the coupling faces and a stator structure having at least one electromagnetic source to create a magnetic force when energized. A magnetic or ferromagnetic translator structure is coupled to the control member for selective, small displacement control member movement. The translator structure is magnetically coupled to the stator structure across an air gap and is supported for translational movement relative to the stator structure along a path between first and second stable end positions which correspond to first and second operating modes of the coupling subassembly, respectively. The translator structure completes a path of the magnetic flux to magnetically latch in at least one of the end positions and translates along the path between the end positions upon experiencing a net translational force comprising a first translational force caused by energization of the at least electromagnetic source and a latching force based upon position of the translator structure along the path.

The assembly may further include at least one biasing member to exert a biasing force on the translator structure. The net translational force further includes the biasing force caused by the at least one biasing member.

One of the end positions may be an overrun position, one of the modes may be an overrun mode, the other of the end positions may be a locked position, and the other of the modes may be a locked mode.

One of the coupling members may include a notch plate and the other of the coupling members may include a pocket plate coupled to the stator structure.

A permanent magnet source may be coupled to the translator structure to translate therewith or coupled to the stator structure.

The assembly may further include a locking member disposed between the coupling faces of the coupling members and movable between first and second positions. The control member causes the locking member to change position in an intermediate position of the translator structure wherein the coupling members are torque-locked going from the first end position to the second end position.

The locking member may be a reverse strut.

The control member may be a control or selector plate rotatable about the axis.

The control member may have at least one opening which extends completely therethrough to allow the locking member to extend therethrough to the first position of the locking member in a control position of the control member.

The path may be a curved path.

Each biasing member may include a spring.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
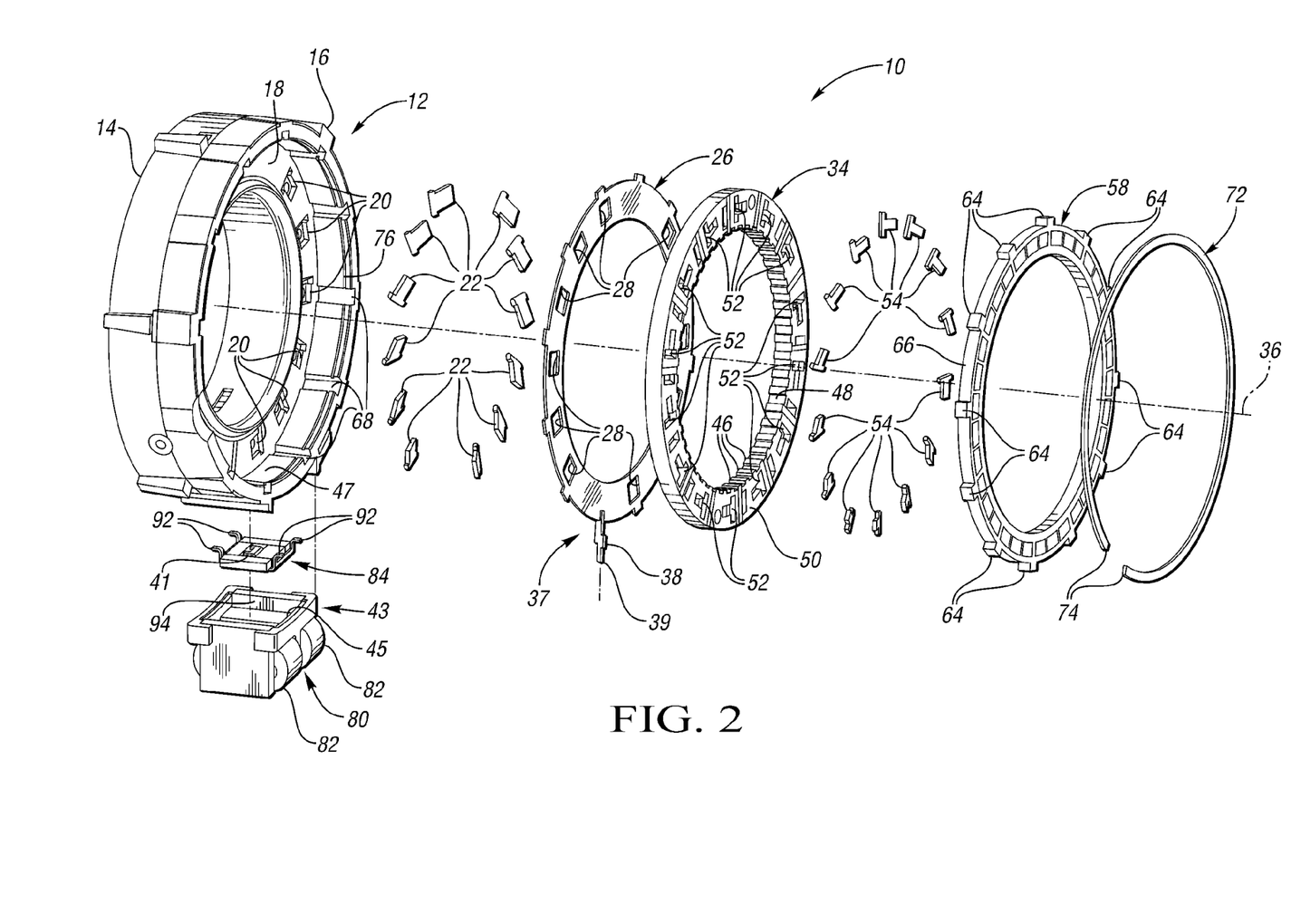
FIG. 2 is an exploded perspective view of an overrunning coupling or clutch and electromagnetic control assembly constructed in accordance with at least one embodiment of the present invention.

Referring again to the drawing figures, FIG. 2 is an exploded perspective view of an overrunning clutch or coupling and control assembly, generally indicated at 10, and constructed in accordance with at least one embodiment of the present invention. As described in U.S. Pat. No. 8,602,187, and pending U.S. patent application Ser. No. 14/150,090 filed Jan. 8, 2014, both assigned to the assignee of the present application, the assembly 10 includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs (not shown) disposed in the pockets 20 under their respective struts 22. Preferably, twelve reverse struts 22 are provided. However, it is to be understood that a greater or lesser number of reverse struts 22 may be provided.

Figure 9:
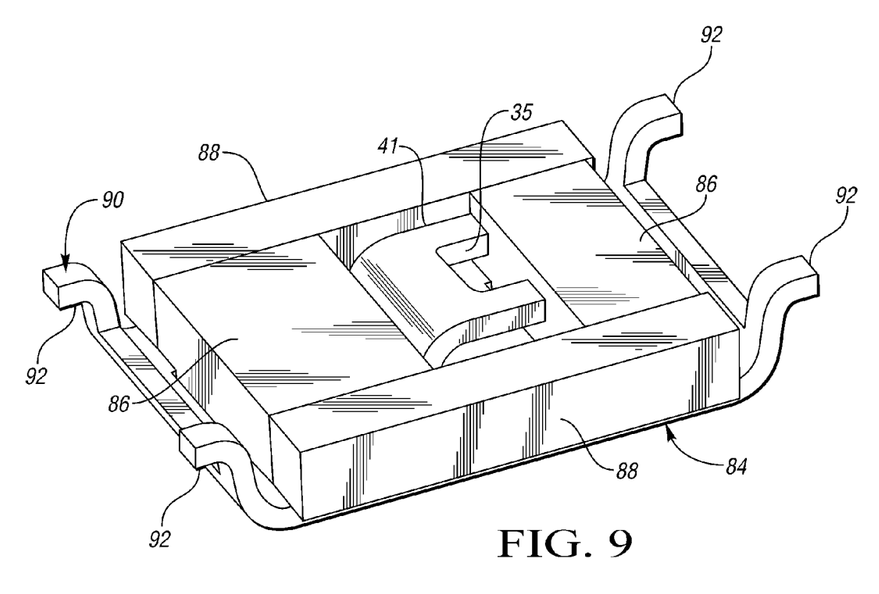
FIG. 9 is a perspective, schematic bottom view of the translator structure of FIG. 8.
Figure 10:
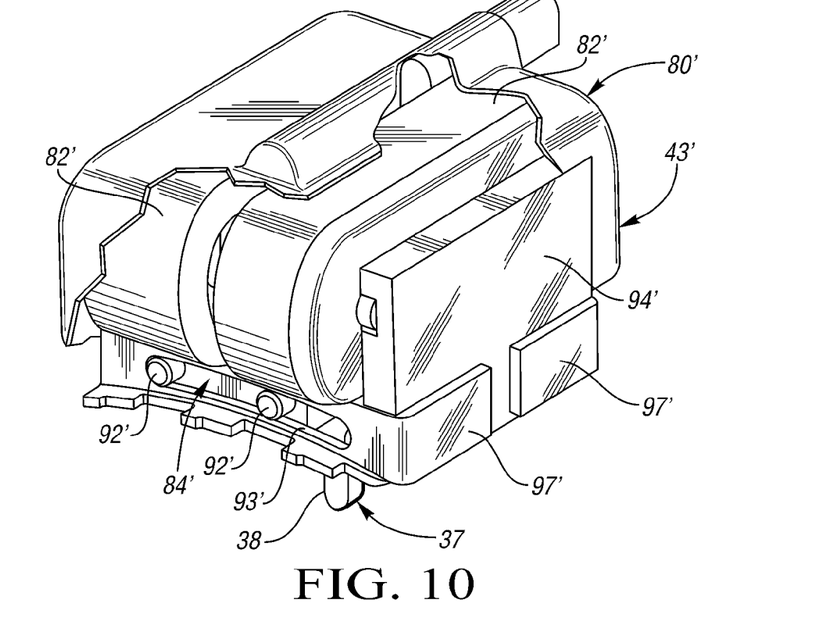
FIG. 10 is a perspective, schematic top view, partially broken away, of a stator structure and a ferromagnetic translator structure of a second embodiment of the invention.
Figure 11:
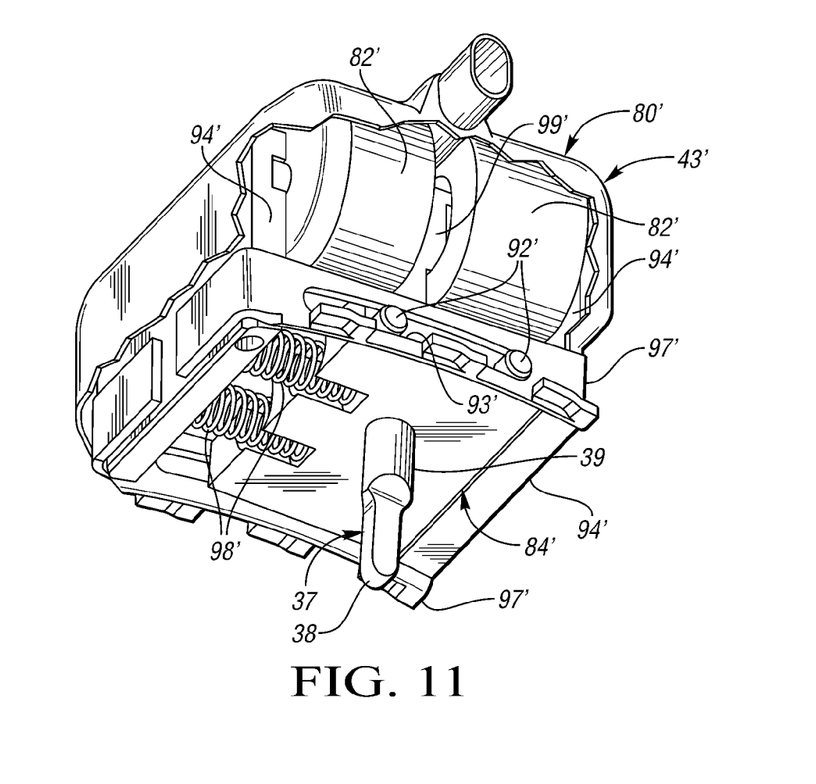
FIG. 11 is a perspective, schematic bottom view, partially broken away, of the structures of FIG. 10 which form parts of an electromagnetic control system.
Figure 12:
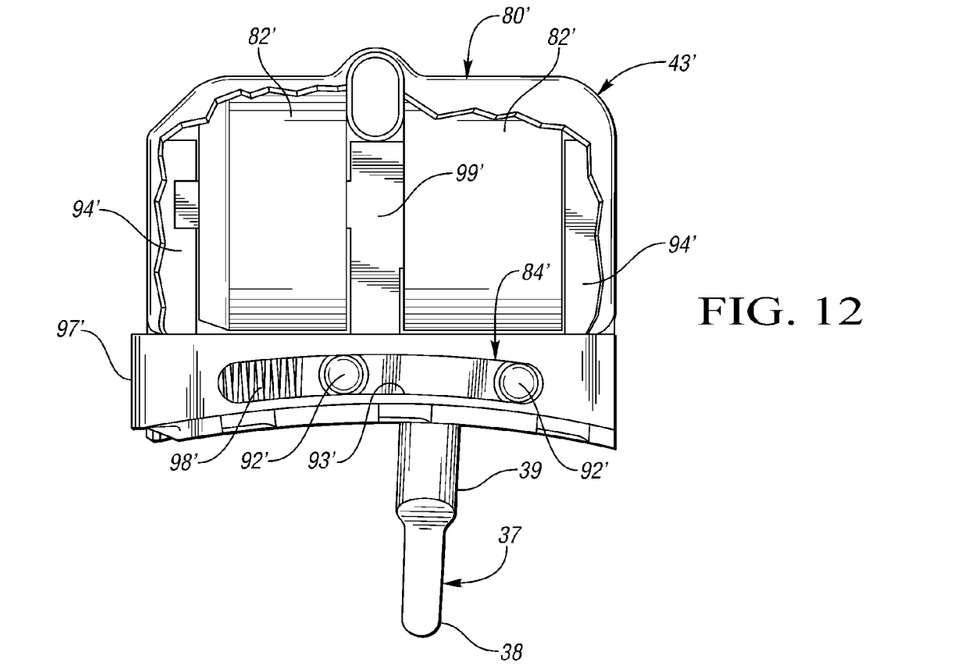
FIG. 12 is a side view, partially broken away, of the structures of FIGS. 10 and 11.
Figure 13:
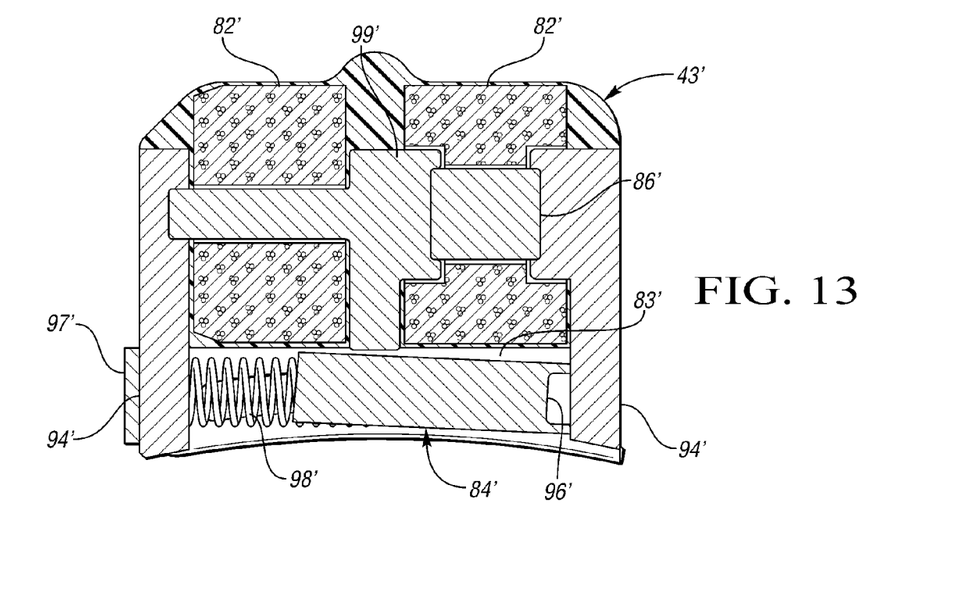
FIG. 13 is a sectional view of the structures of FIG. 12.
Figure 14:
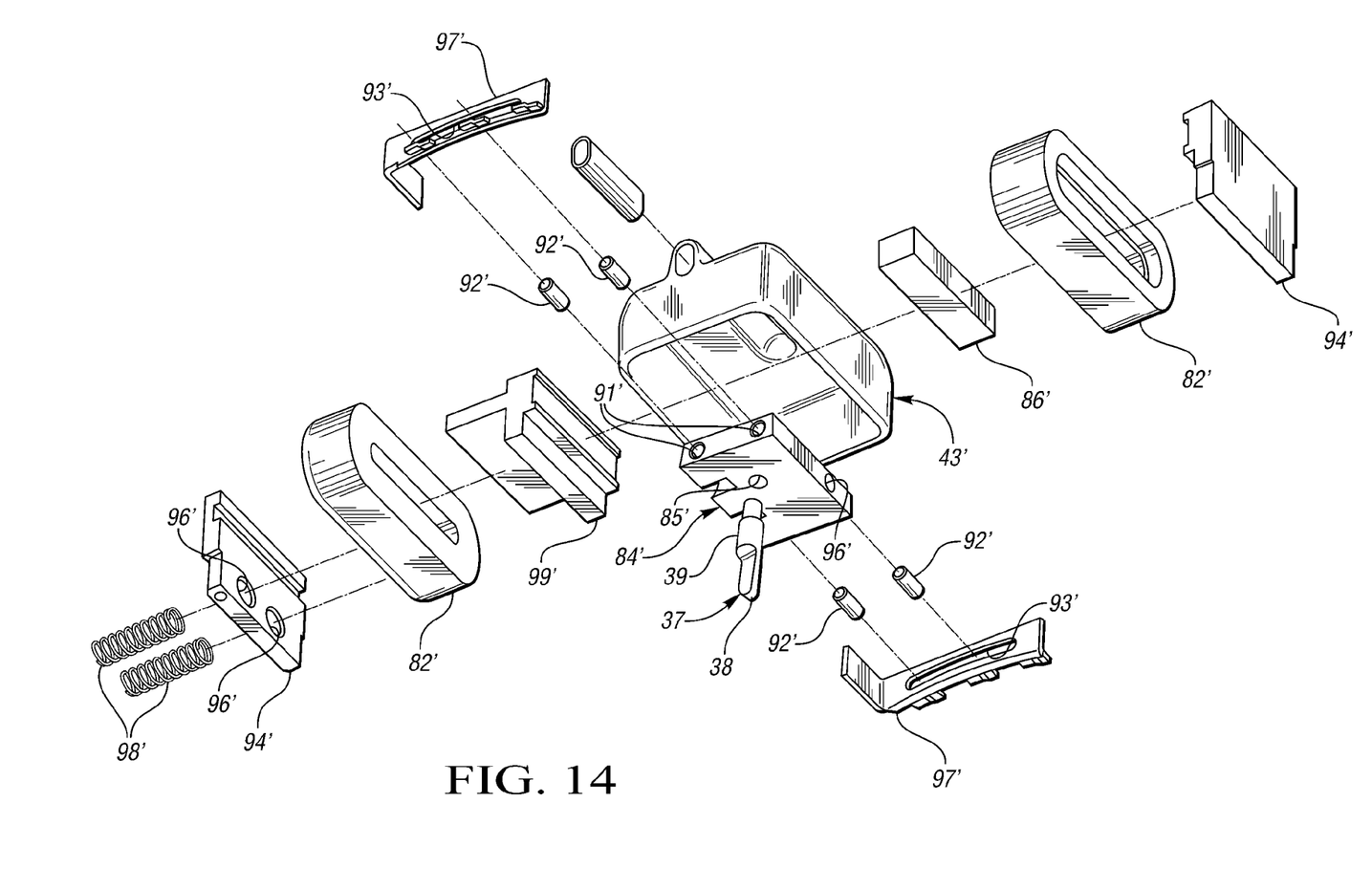
FIG. 14 is an exploded perspective view of parts of the control system of FIG. 13.

The assembly 10 also includes a control element or selector slide plate, generally indicated at 26, having a plurality of spaced apertures 28 extending completely therethrough to allow the reverse struts 22 to pivot in their pockets 20 and extend through the apertures 28 to engage spaced locking formations or ramped reverse notches (not shown) formed in a radially extending surface or coupling face of a forward or inner pocket plate or coupling member, generally indicated at 34, when the plate 26 is properly angularly positioned about a common central rotational axis 36 by an actuator arm, generally indicated at 37. The arm 37 includes a shift fork part 38 coupled to the plate 26 and a pin portion 39 coupled to and retained within a pin retainer 41 within a slot 35 formed in the retainer 41 (FIG. 9).

Figure 3:
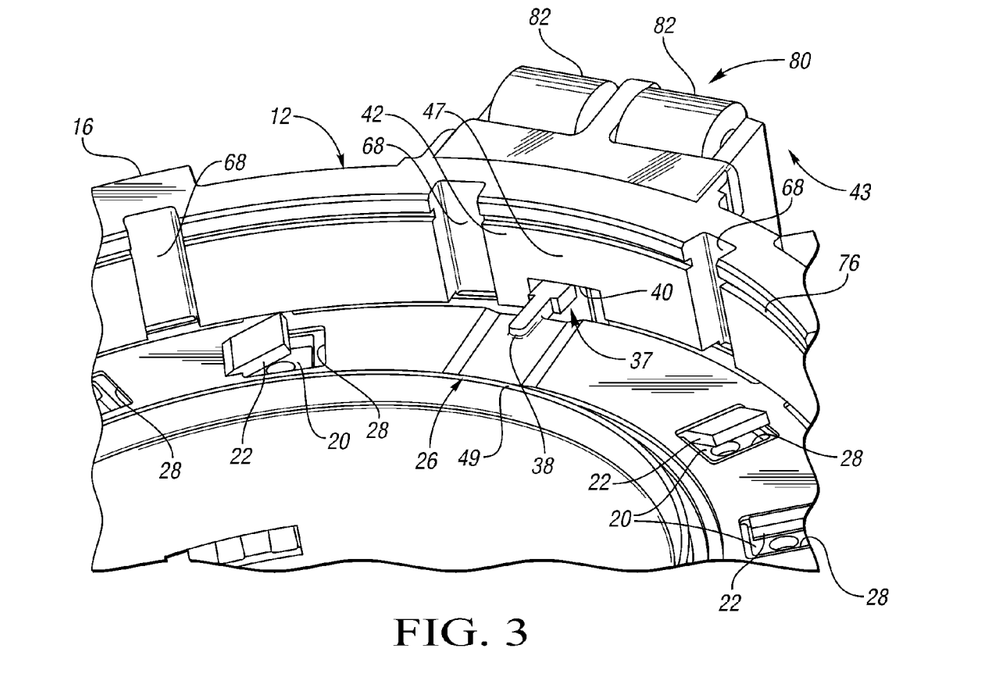
FIG. 3 is a perspective schematic view, partially broken away, of a control element (selector plate) coupled to an actuator arm which has rotated or shifted the control element to expose reverse struts.
Figure 4:
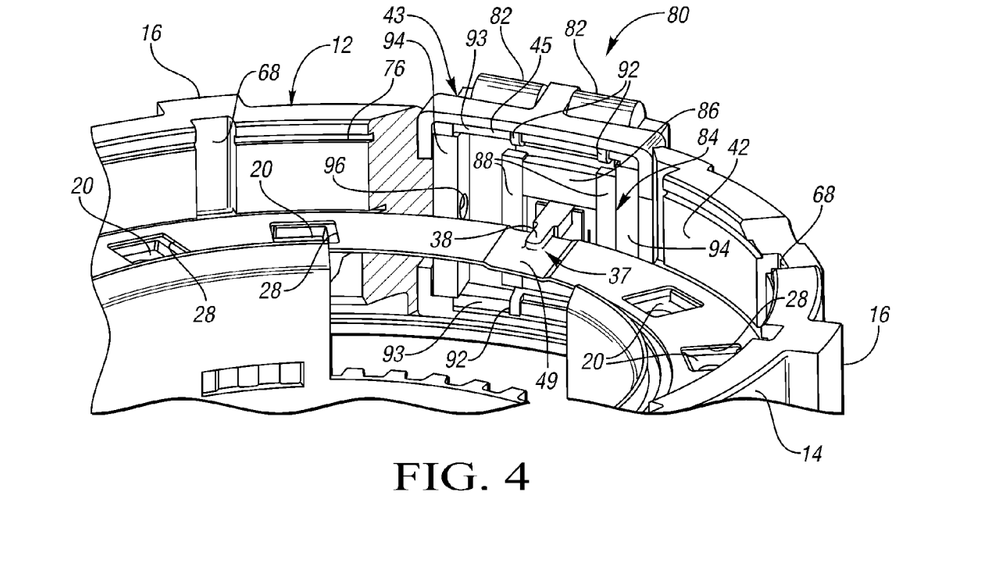
FIG. 4 is a perspective schematic view, similar to the view of FIG. 3, with a portion of the common wall separating and shared by a first coupling member and a housing removed to show a magnetic translator structure and the actuator arm in the housing and with the reverse struts removed.
Figure 5:
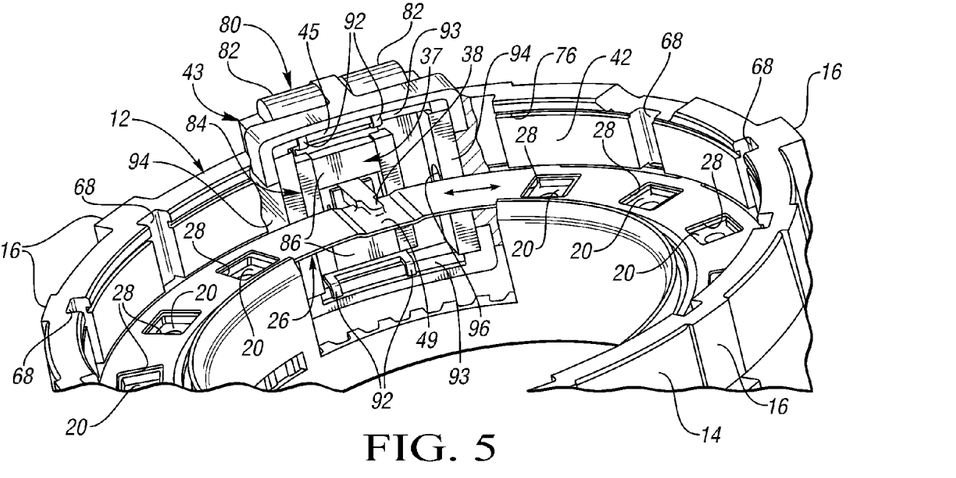
FIG. 5 is a perspective schematic view, similar to the view of FIG. 4, with the portion of the common wall removed wherein circumferential movement of the translator structure creates rotary movement of the selector plate.
Figure 6:
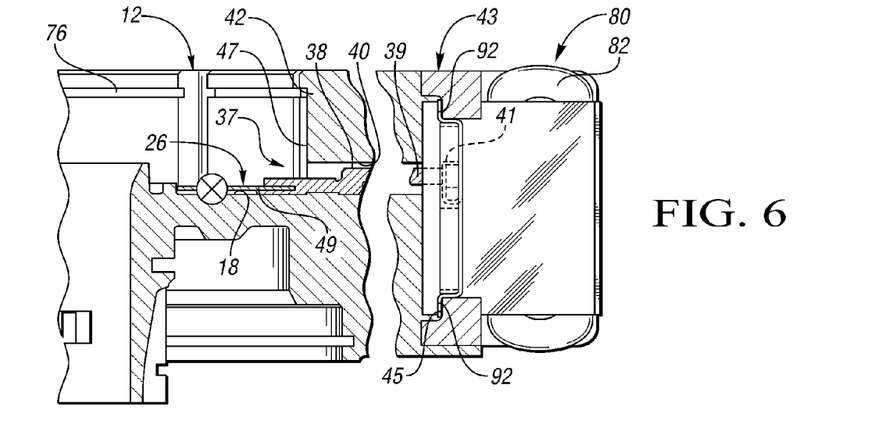
FIG. 6 is a view, partially broken away and in cross section, showing how the selector plate is actuated by movement of the translator structure.

As shown in FIGS. 3 and 6, the arm 37 extends through a notch or elongated slot 40 formed through a wall or wall portion 42 of an outer circumferential end wall of the plate 12. The wall 42 is a common wall separating and shared by the first coupling member 12 and a housing, generally indicated at 43. The elongated slot 40 extends between and thereby communicates an inner surface 45 of the housing 43 and an inner surface 47 of the wall 42 of the first coupling member 12. The fork part 38 of the arm 37 is secured or coupled to the control plate 26 at a depressed portion 49 of the plate 26. The pin portion 39 of the arm 37 moves in the slot 40 between different use positions to cause the plate 26 to slide or shift between its control positions to alternately cover or uncover the struts 22 (i.e., to engage or disengage the reverse struts 22, respectively).

The plate 34 comprises a splined ring having internal splines 46 formed at its inner axially extending surface 48. A radially extending surface 50 or coupling face spaced from the other coupling face (not shown) of the plate 34 has a plurality of spaced pockets 52 formed therein to receive a plurality of forward struts 54 therein which are pivotally biased by corresponding coil springs (not shown). Preferably, fourteen forward struts 54 are provided. However, it is to be understood that a greater or lesser number of forward struts 54 may be provided.

The assembly 10 may also include a second outer coupling member or notch plate, generally indicated at 58, which has a plurality of locking formations, cams or notches (not shown) formed in a radially extending surface or coupling face (not shown) thereof by which the forward struts 54 lock the forward plate 34 to the notch plate 58 in one direction about the axis 36 but allow free-wheeling in the opposite direction about the axis 36. The notch plate 58 includes external splines 64 which are formed on an outer axial surface 66 of the plate 58 and which are received and retained within axially extending recesses 68 formed within the inner axially extending surface 47 of the outer circumferential end wall of the plate 12.

The assembly 10 may further include a snap ring, generally indicated at 72, having end portions 74 and which fits within an annular groove 76 formed within the inner surface 47 of the end wall of the plate 12 to hold the plates 12, 26, 34 and 58 together and limit axial movement of the plates relative to one another.

Figure 7:
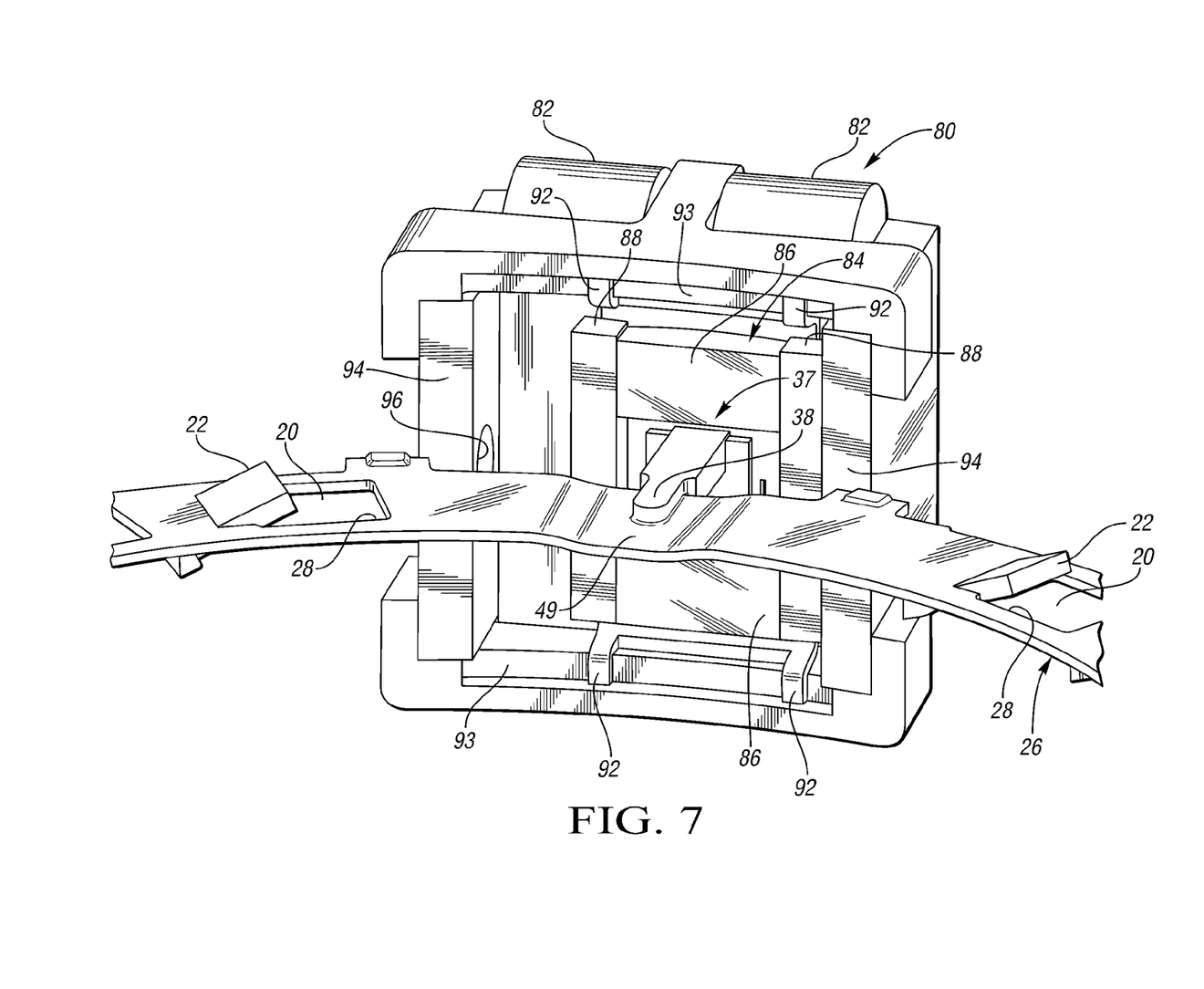
FIG. 7 is a view, partially broken away, of a stator structure, the actuator arm, the translator structure and the control element pushing the struts down.
Figure 8:
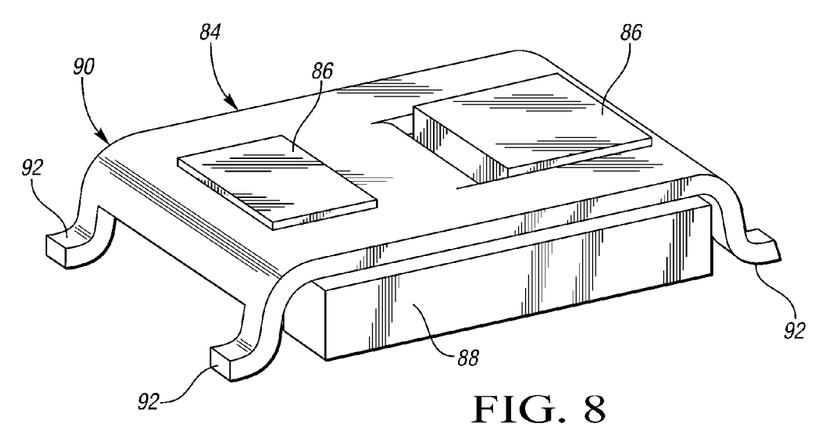
FIG. 8 is a perspective, schematic top view of the translator structure and a pair of spaced permanent magnets.

FIG. 3 is a view of the assembly 10 with the shift fork 38 of the arm 37 in one control position of its control positions to disengage the reverse struts 22. The shift fork 38 is rotated between about 5° and 7° in a forward overrun direction about the axis 36 to rotate the selector plate 26 to, in turn, allow the reverse struts 22 to move from their disengaged position in their pockets 20 to their engaged position with the notches (not shown) of the plate 34. At about 2.5° to 3.5° of rotation (about one half the stroke distance as shown in FIG. 7), the plate 26 makes contact with the back side of the locked struts 22.

Referring to FIGS. 2-9, the housing 43 houses a stator structure, generally indicated at 80, coupled to the coupling member 12 to move therewith. The stator structure 80 includes at least one electromagnetic source to create a magnetic force when energized. The stator structure 80 includes at least one (preferably two, as shown here) electrically inductive coils 82 to create a magnetic flux and a magnetic force when energized.

In the embodiment of FIGS. 2-9, a translator structure, generally indicated at 84, is coupled to the actuator arm 37 at its pin portion 39 for selective, small displacement, actuator arm movement. The translator structure 84, includes a permanent magnet source in the form of a pair of rare earth magnets 86 (FIGS. 8 and 9) magnetically coupled to the stator structure 80 across an air gap and supported for translational movement relative to the stator structure 80 along a path between first and second stable end positions which correspond to first and second operating modes of the coupling assembly, respectively. The first and second modes may be locked and unlocked (i.e. free wheeling) modes. The translator structure 84 also includes a part of steel bars 88 which complete a path of the magnetic flux to magnetically latch in at least one of the end positions. The structure 84 also includes a bent bracket 90 having legs 92 which allow the structure 84 to translate along the path between the different positions upon experiencing a net translational force. The net translational force includes a first translational force caused by selective energization of the coils 82 and a latching force based upon position of magnets 86 relative to the position of the translator structure 84 along the path which is provided by at least one surface 45 on which the legs 92 slide. The at least one surface 45 is preferably a pair of curved, spaced apart surfaces 93.

The stator structure 80 also preferably includes a pair of spaced steel pieces 94 which not only function as stops, but also to help complete the path of the magnetic flux. The steel pieces 94 include apertures 96 to seat at least one biasing member such as one or more springs (not shown) to exert one or more biasing forces on the translator structure 84. The net translational force further comprises the biasing force(s) caused by the at least one biasing member.

Referring now to FIGS. 10-14 there is shown a second embodiment of a control system for controlling movement of the actuator arm 37 which, in turn, bi-directionally moves the control member 26. In the embodiment of FIGS. 10-14 parts which have the same or similar function and/or structure as those parts of the first embodiment have the same reference number but a single prime designation.

The system of FIGS. 10-14 includes a stator structure, generally indicated at 80', housed within a plastic housing 43' and coupled to the coupling member 12 to move therewith and including at least one electromagnetic source (i.e. preferably 2 coils 82') to create a magnetic flux and a magnetic force when energized. Unlike the first embodiment, the structure 80' itself includes a permanent magnet source 86' (i.e. rare earth magnet).

The subassembly also includes a translator structure, generally indicated at 84', which is coupled to the actuator arm 37 for selective, small displacement actuator arm movement. The translator structure 84' is magnetically coupled to the stator structure 80' as it travels along a path between first and second stable end positions which correspond to first and second operating modes of the clutch assembly, respectively. The first and second modes may be locked or unlocked (i.e. free wheeling) modes. The translator structure 84' completes a path of the magnetic flux to magnetically latch at least at one of the end positions and to translate along the path between the end positions upon experiencing a net translational force comprising a first translational force caused by energization of the at least electromagnetic source (coils 82') and a latching force based upon position of the permanent magnet source (magnet 86') relative to the position of the translator structure 84' along the path.

The structure 84' also includes two pair of spaced legs or pins 92' which travel in a pair of spaced carved slots 93' defined by bent brackets 97' which are coupled to a steel plate 94'. The pins 92' are secured in apertures 91' formed in opposite sides of the translator structure 84'.

The stator structure 80' also preferably includes a pair of spaced steel plates 94' which help to complete the path of magnetic flux. The steel plates 94' may include apertures 96' and the opposite side surfaces of the structure 84' may also include apertures 96' to seat one or more springs 98' which exert a biasing force on the translator structure 84'. As a result, the net translational force further includes the biasing force caused by the biasing members 98'.

The subassembly of FIGS. 10-14 further includes a steel, skeletal frame structure 99' which together with the housing 43' interconnect the various parts of the stator structure 80' together.

The following is a description of how the embodiment of FIGS. 10-14 operates to control the position of the actuator arm 37 and, consequently, the control member 26 between the coupling members 12 and 34:

In the "off" position, one preferably needs about 15 lbs of holding force (Latch Force+spring force) in one of the end positions of the translator structure 84'.

The entire stroke of the slide plate 26 is about 8 mm. That corresponds to about 5 degrees of travel of the plate 26. If the clutch is "torque locked" going from ON to OFF, that stroke is less than 2.5 degrees before the slide plate 26 makes contact with the back side of the locked struts 22 (FIG. 7). The following is the sequence of example events going from ON to OFF for the "torque locked" clutch.

The clutch is "on" holding at magnetic latch force—return spring force in the ON position is applying a force towards the OFF direction. The spring force is at a max value because it is at its most compressed trying to move the slide plate 26 to the OFF position (of FIGS. 10-13). The magnetic latch is greater than the spring force. This implies a weak spring and a strong latch is required (i.e., latch force>spring force in ON position).

The coils 82' are now "turned on" to cancel the latch force caused by the magnet 86' and stroke the slide plate 26. The plate 26 moves only a little bit off the latch because the struts 22 are torque locked (less than 2.5 degrees of rotation). The slide plate 26 is being held against the back of the strut 22 primarily by the spring force and whatever force the energized coils 82' are pushing against the force caused by the magnet 26'.

If this is a momentary device, meaning that one pulses the coils 82' "on" to unlatch and stroke, then turn the coils 82' "off". It is at this point in time that when the coils 82' are turned "off" and the translator structure 84' is less than ½ thru the stroke, the only force acting on the slide plate 26 going toward the "off" position is spring force. There is a counter force from the latch ON direction as soon as the power is cut. So at this small stroke, the spring force needs to be greater than the weakened ON latch force. This force is weakened because the gap has increased via the stroke. So the requirement would be: spring force>Weakened ON latch force at the distance the slide plate 26 makes contact with the back of the struts 22.

The above condition is maintained until there is a torque reversal in the clutch freeing up the locked struts 22. The return springs 98' are now free to move the slide plate 26 to the OFF position. As the stroke goes over center via the return springs 98', the OFF magnetic latch starts to enforce the spring force. And as the slide plate 26 approaches the OFF position, the enforcing magnetic force to the return spring force grows stronger.

So a good design of the latch force would be one that is very high at the end positions of travel (greater than the spring force) of the stroke and weakens quickly as the translator structure 84' moves away from the end positions such that the return springs 98' are the primary force during the stroke and the magnet force is less.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electromagnetic system for controlling an operating mode of an overrunning coupling assembly including first and second coupling members having first and second coupling faces, respectively, in close-spaced opposition with one another, at least one of the members being mounted for rotation about a rotary axis, the system comprising;
    a control member mounted for controlled shifting movement between the coupling faces;
    a stator structure including at least one electromagnetic source to create a magnetic force when energized;
    a magnetic or ferromagnetic translator structure coupled to the control member for selective displacement, control member movement, the translator structure being magnetically coupled to the stator structure across an air gap and supported for translational movement relative to the stator structure along a path between first and second stable end positions which correspond to first and second operating modes of the coupling assembly, respectively, the translator structure completing a path of magnetic flux to magnetically latch in at least one of the end positions and to translate along the path between the end positions upon experiencing a net translational force comprising a first translational force caused by energization of the at least electromagnetic source and a latching force based upon position of the translator structure along the path.

2. The system as claimed in claim 1, further comprising at least one biasing member to exert a biasing force on the translator structure, the net translational force further comprising the biasing force caused by the at least one biasing member.

3. The system as claimed in claim 1, further comprising a permanent magnet source coupled to the translator structure to translate therewith.

4. The system as claimed in claim 1, further comprising a permanent magnet source coupled to the stator structure.

5. The system as claimed in claim 1, wherein one of the end positions is an overrun position, one of the modes is an overrun mode, the other of the end positions is a locked position, and the other of the modes is a locked mode.

6. The system as claimed in claim 1, wherein one of the coupling members includes a notch plate and the other of the coupling members includes a pocket plate coupled to the stator structure.

7. The system as claimed in claim 1, further comprising a locking member disposed between the coupling faces of the coupling members and being movable between first and second positions, the control member causing the locking member to change position in an intermediate position of the translator structure and wherein the coupling members are torque-locked going from the first end position to the second end position.

8. The system as claimed in claim 7, wherein the locking member is a reverse strut.

9. The system as claimed in claim 7, wherein the control member is a control or selector plate rotatable about the axis.

10. The system as claimed in claim 7, wherein the control member has at least one opening which extends completely therethrough to allow the locking member to extend therethrough to the first position of the locking member in a control position of the control member.

11. The system as claimed in claim 1, wherein the path is a curved path.

12. The system as claimed in claim 2, wherein each biasing member includes a return spring.

13. An overrunning coupling and electromagnetic control assembly comprising:
    a coupling subassembly including first and second coupling members having first and second coupling faces, respectively, in close-spaced opposition with one another, at least one of the members being mounted for rotation about a rotary axis;
    a control member mounted for controlled shifting movement between the coupling faces;
    a stator structure including at least one electromagnetic source to create a magnetic force when energized;
    a magnetic or ferromagnetic translator structure coupled to the control member for selective displacement, control member movement, the translator structure being magnetically coupled to the stator structure across an air gap and supported for translational movement relative to the stator structure along a path between first and second stable end positions which correspond to first and second operating modes of the coupling subassembly, respectively, the translator structure completing a path of magnetic flux to magnetically latch in at least one of the end positions and to translate along the path between the end positions upon experiencing a net translational force comprising a first translational force caused by energization of the at least electromagnetic source and a latching force based upon position of the translator structure along the path.

14. The assembly as claimed in claim 13, further comprising at least one biasing member to exert a biasing force on the translator structure, the net translational force further comprising the biasing force caused by the at least one biasing member.

15. The assembly as claimed in claim 13, wherein one of the end positions is an overrun position, one of the modes is an overrun mode, the other of the end positions is a locked position, and the other of the modes is a locked mode.

16. The assembly as claimed in claim 13, wherein one of the coupling members includes a notch plate and the other of the coupling members includes a pocket plate coupled to the stator structure.

17. The assembly as claimed in claim 13, further comprising a permanent magnet source coupled to the translator structure to translate therewith.

18. The assembly as claimed in claim 13, further comprising a permanent magnet source coupled to the stator structure.

19. The assembly as claimed in claim 13, further comprising a locking member disposed between the coupling faces of the coupling members and being movable between first and second positions, the control member causing the locking member to change position in an intermediate position of the translator structure and wherein the coupling members are torque-locked going from the first end position to the second end position.

20. The assembly as claimed in claim 19, wherein the locking member is a reverse strut.

21. The assembly as claimed in claim 19, wherein the control member is a control or selector plate rotatable about the axis.

22. The assembly as claimed in claim 19, wherein the control member has at least one opening which extends completely therethrough to allow the locking member to extend therethrough to the first position of the locking member in a control position of the control member.

23. The assembly as claimed in claim 13, wherein the path is a curved path.

24. The assembly as claimed in claim 14, wherein each biasing member includes a spring.

* * * * *